April 19, 1932. J. H. HAMMON Re. 18,427

SPECTACLE LENS

Original Filed April 6, 1927

INVENTOR.
JAMES H. HAMMON.

BY
Lockwood Lockwood Goldsmith & Gaet
ATTORNEYS.

Reissued Apr. 19, 1932 Re. 18,427

UNITED STATES PATENT OFFICE

JAMES H. HAMMON, OF VINCENNES, INDIANA

SPECTACLE LENS

Original No. 1,740,298, dated December 17, 1929, Serial No. 181,557, filed April 6, 1927. Application for reissue filed October 17, 1930. Serial No. 489,468.

My invention relates to multi-focal spectacle lenses, and has for its object to produce a spectacle lens for those people who require different correction for distance and for near vision, in lenses having continuous front and back surfaces, and the bifocal side has an uninterrupted curvature.

My improvement consists in making such continuous surfaced lenses so that the user, when looking through them and changing from distant to near vision and vice versa, shall see no apparent displacement or jump of the object viewed.

My improvement further consists in making the portion used for near vision a prism whose base or thicker portion is directed toward the center of the lens.

I shall explain my invention with reference to the drawings, in which like parts are similarly designated and in which—

Figure 4:
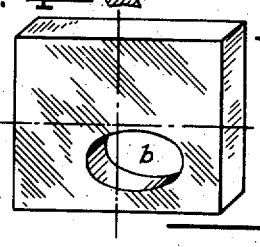
Figure 3:
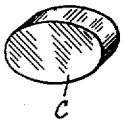
Fig. 3 shows the button.

Fig. 4 the major portion of the blank having a perforation in which the button fits.

Figure 5:
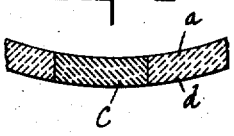

Fig. 5 is a section showing the button fused in the perforation and the lower face of the compound portion surfaced and polished.

Figure 6:
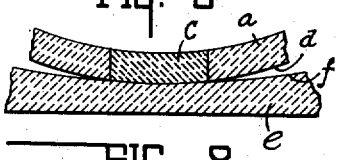

Fig. 6 is a section showing the major portion and button superimposed on a third spherical surface of proper curvature preparatory for fusing.

Figure 7:
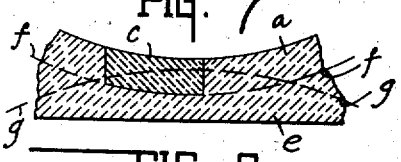

Fig. 7 is a cross section of a fused or rough blank.

Figure 8:
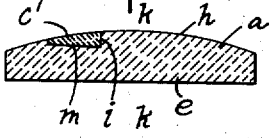

Fig. 8 is a cross section of a blank after polishing one surface to form a semi-finished blank.

Figure 9:
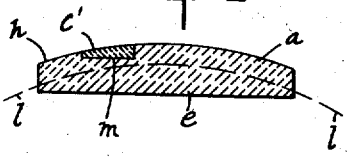

Fig. 9 shows where the opposite surface is to be cut by the optician.

The details of my process are preferably as follows.

I first take a piece of crown glass *a* or the like that is to form a part of the main portion of the lens blank, perforate or make a hole *b* in it and polish the walls thereof. I then insert in this perforation *b* what is termed in the trade a button *c* whose sides are preferably polished. This button *c* has a different index of refraction than the piece *a*. They may then be fused together by the well known method of fusing or otherwise.

I then heat the glass to soften it and press or mold this compound portion into one piece to approximate or desired shape, and polish one face, as the face *d* in Fig. 5, which preferably but not necessarily is of lesser radius than a third or cover portion *e* of the blank.

The cover portion *e* of the blank is a glass having preferably the same index of refraction as the crown portion or approximately the same, and its one surface *f* is ground and polished to the proper surface or curvature for giving to the surface of the button that shape or curvature required by one end *m* of the button that is to be covered by the portion *e*.

The assemblage is then fused together, producing the composite piece of fused glass illustrated in Fig. 7. From this composite piece the rough blank is ground along a line, as *g*—*g* for example, to the proper curvature or diopter for one face of the commercial or semi-finished blank, and this face is then polished, giving one polished face *h* of continuous or unbroken surface and leaving a portion of the button *c* whose one face *m* is covered by the glass of the portion *o* and its thicker portion or base *i* is directed toward the center or geometrical axis *k*—*k* of the finished lens to be ground from such blank.

In this form the blank is sold to the optician who, knowing or being informed of the power or diopter of both the prism *c'* and polished surface *h*, then, according to technical directions, grinds and polishes the other surface of the blank to that dioptric curve that when combined with the dioptric curve or curves of the other surface, as *h*, gives the required correction and proper location of optical centers for the wearer of the spectacles.

Figure 1:
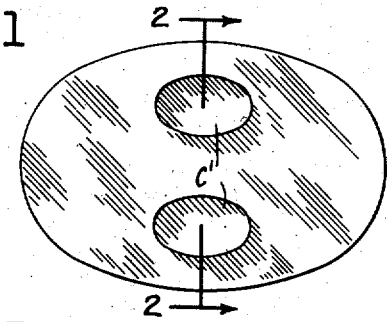
Figure 1 is an elevation illustrating a spectacle lens such as used by paper hangers and others who require near vision both when looking up and down.
Figure 2:
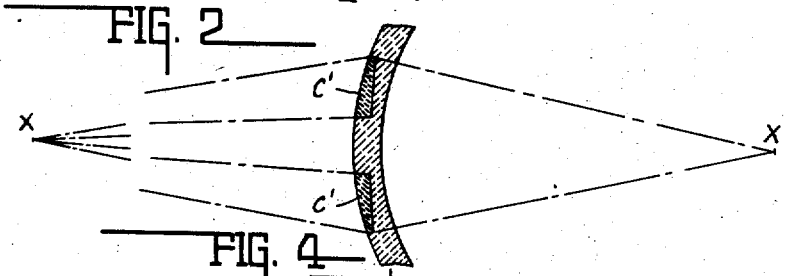
Fig. 2 is a section on line 2—2 of Fig. 1.

By such a construction all the surfaces of the lens, i. e., front and rear surfaces of the prism *c'*, may have a common axis, as *x*—*x* in Fig. 2. This will, of course, be so in all cases except when the one face of the prism *c'* is a plane, in which case its plane or flat side will be at right angles to this axis, but the thicker base *i* will in all cases be directed toward the center of the finished lens.

Of course, it is understood that what opticians understand to be a prism may have curved or spherical surfaces, or flat surfaces or both flat and curved surfaces; in other words, it may be considered a sort of lens in which the geometrical and optical centers of the prism do not coincide.

The invention claimed is:

1. A multi-focal fused spectacle lens having a major perforated portion surrounding a fused insert portion and both fused to a third portion of substantially the same kind of glass as the major perforated portion, said insert portion forming a prism having the same cross sectional area as the perforation covered by the third portion.

2. A multi-focal fused spectacle lens having a major perforated portion and a fused insert portion both ground and polished, and a third portion ground and polished to the required surface and of substantially the same kind of glass as the major perforated portion surrounding said insert portion, said insert portion forming a prism covered by said third portion on one face and having its opposite exposed face of the same shape as the corresponding portion of the lens with the area of the insert portion of the same cross section as the perforation.

3. A multi-focal fused spectacle lens having a major perforated portion and a fused insert portion both ground and polished and a third portion fused thereto ground and polished to the required surface and of substantially the same glass as the major perforated portion, said insert portion forming a prism covered by the third portion and surrounded by the major perforation portion, and the outer exposed face of said prism conforming to the outer surface of the lens and of the same area as the cross section of the perforation.

4. A multi-focal fused spectacle lens having a major perforated portion surrounding a fused insert portion and fused thereto, a third portion covering the insert portion, said insert portion forming a prism whose base is directed toward the centre of the lens and whose outline is determined by and of the same size as the perforation.

5. A multi-focal spectacle lens having a major perforation portion, and a prism inserted in and surrounded by said portion having its base toward the centre of the lens and having one face concentric with the face of the lens, and a covering for the prism of substantially the same index of refraction as said major portion and the outline of said insert portion determined as to size and contour by the perforation.

6. A multi-focal fused spectacle lens blank having a button fused in a perforation therein of prismatic shape with the base toward the centre of the blank, said blank having one continuous ground and polished surface including the button and the opposite face of the blank fused to a layer of glass that covers the button.

7. The method of making a fused multifocal lens, which comprises fusing a button in an opening through a portion of a blank to form a composite blank, grinding and polishing a companion blank to the desired surface, fusing the composite blank onto the polished surface of the companion blank so as to cover the button, and forming a lens from the blank.

8. The method of making a fused multifocal lens, which comprises fusing a polished button in an opening through a portion of a blank to form a composite blank, pressing the composite blank to approximate surface curvature and grinding and polishing one face of the composite blank, fusing the polished face of the composite blank to a polished surface of a companion blank whose polished face has the surface desired.

9. A multi-focal fused spectacle blank having a major portion having a perforation therethrough with straight walls from end to end thereof, a button corresponding in shape to said perforation and fitted and fused therein, a companion blank to which one face of said major button portion is fused and the opposite face of said major portion being finished.

10. A multi-focal fused spectacle lens having a major portion with a perforation therethrough having different rectangular dimensions in cross section and an inserted portion fused in the perforation, a companion glass to which said major portion and inserted portion are fused and of the same kind of glass as the major portion.

11. The method of making a fused multifocal lens, which comprises fitting a button of one index of refraction into a perforation in a major blank of a different index of refraction, fusing the button into the blank, grinding the lower face of the blank to give the end of the button a proper curvature, fusing the ground surface to a glass, and grinding and polishing the exposed face of the major blank including the exposed face of the button, said button determining the size and shape of the insert portion of the finished lens.

12. In a method for the manufacture of a fused bifocal lens blank which comprises fusing onto a major lens in one side of which has been ground a depression or like surface, a correspondingly ground segment prepared by forming an insert receiving hole in a plate of glass of substantially the same refractive index as the major lens, placing an insert of glass of a different refractive index in said hole, and then fusing the insert to the segment.

13. A method for the manufacture of a fused bifocal lens blank which consists in forming a piece of glass with one face thereof surfaced, forming a compound segment consisting of a piece of glass of the same refractive index as said first-mentioned piece of glass with an insert-receiving hole in it, fusing an inserted piece of glass of different refractive index in said hole, surfacing one side of said compound segment to substantially the opposite curvature of the surfaced portion of said first-mentioned piece of glass, and then fusing said compound segment upon the surfaced portion of said first-mentioned piece of glass.

14. A method for the manufacture of a fused bifocal lens blank which consists in forming a piece of glass with one face thereof surfaced, forming a compound segment consisting of a piece of glass of the same refractive index as said first-mentioned piece of glass with an insert-receiving hole in it, fusing an inserted piece of glass of different refractive index in said hole, surfacing one side of said compound segment to substantially the opposite curvature of the surfaced portion of said first-mentioned piece of glass, fusing said compound segment upon the surfaced portion of said first-mentioned piece of glass, and then providing a final bifocal surface cutting all of said pieces of glass, substantially as set forth.

15. In the method of making a multifocal fused lens, providing a hole in a piece of glass of one index of refraction, fusing a minor insert portion of a different index of refraction in said first-mentioned portion of glass so as to be entirely surrounded thereby, surfacing one side of the compound piece of glass so as to shape the inner face of the minor insert portion, surfacing one side of a third piece of glass, and fusing said compound piece of glass upon the surfaced portion of said third piece of glass.

16. In the method of making a multifocal fused lens, providing a hole in a piece of glass of one index of refraction, fusing a minor insert portion of a different index of refraction in said first-mentioned portion of glass so as to be entirely surrounded thereby, surfacing one side of the compound piece of glass so as to shape the inner face of the minor insert portion, surfacing one side of a third piece of glass, fusing said compound piece of glass upon the surfaced portion of said third piece of glass, and then grinding away some of the exposed parts of said compound piece of glass so as to provide the finished lens with a continuous uninterrupted curvature on the bifocal side.

17. A multi-focal fused spectacle lens having a major portion made of glass of one index of refraction suitable for distance vision, and a minor portion made of glass of a different index of refraction suitable for near vision embedded in, covered on one side and surrounded by said major portion and having a peripheral wall around it substantially perpendicular to the surface of the lens, and each side of said lens having a continuous uninterrupted curvature.

18. A multi-focal fused spectacle lens having a major portion composed of glass of one index of refraction suitable for distance vision with a hole formed in one side thereof extending into said major portion and having a continuous peripheral wall substantially perpendicular to the surface of the lens, and a minor portion of glass having a different index of refraction suitable for near vision imbedded and fused in said hole, and the bifocal side of said lens with the exposed surface of said minor and major portions of the lens having one continuous uninterrupted curvature with the minor portion surrounded and covered on one side by the said major portion.

19. A multi-focal fused spectacle lens formed with the major portion of glass having one index of refraction suitable for distance vision and a hole in one side thereof with its width greater than its length and having a peripheral wall substantially perpendicular to the surface of the lens, and a minor portion composed of glass of a different index of refraction imbedded and fused in said hole and conforming in shape thereto and covered on one side thereby, and the bifocal side of said lens being surfaced throughout with a continuous uninterrupted curvature including the exposed surface of said minor portion of the lens.

20. A multi-focal fused spectacle lens having a major portion formed of glass of one index of refraction with a hole formed in one side thereof the peripheral wall of which is substantially perpendicular to the surface of the lens, a minor portion of glass made of a different index of refraction suitable for near vision having the same transverse conformation as said hole and its inner end having the same curvature as the bottom of the hole and imbedded and fused therein, one side of the minor portion being covered by the said major portion, and each side surface of said lens having a continuous uninterrupted curvature including the exposed surface of said minor portion, whereby the optical center of said minor or near vision portion can be predetermined in the manufacture of the lens.

In witness whereof, I have hereunto affixed my signature.

JAMES H. HAMMON.